P. F. GLAZIER.
UNIVERSAL HOSE COUPLING.
APPLICATION FILED MAR. 19, 1917.
1,237,633.
Patented Aug. 21, 1917.
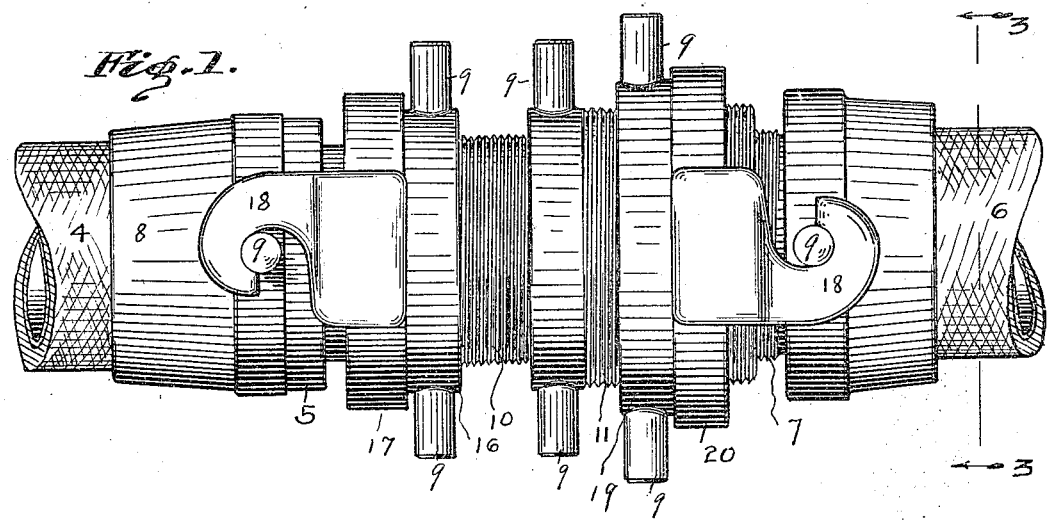
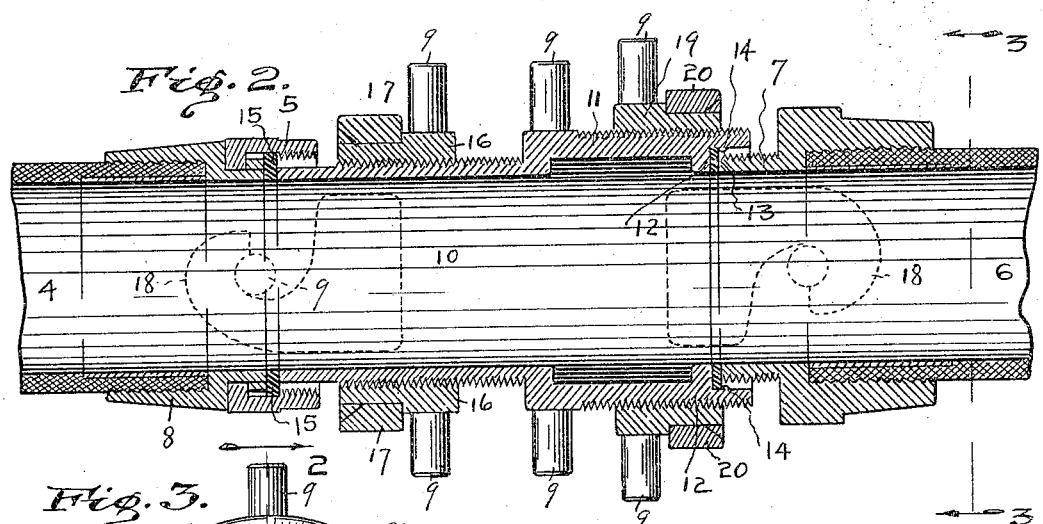
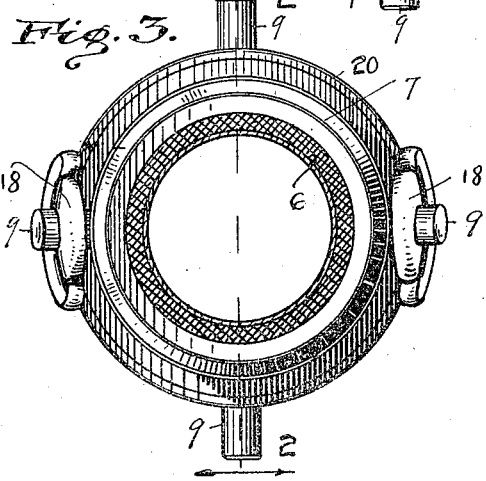
Inventor,
Peter F. Glazier,
By Minturn & Woerner
Attorneys.

UNITED STATES PATENT OFFICE.

PETER F. GLAZIER, OF INDIANAPOLIS, INDIANA, ASSIGNOR OF ONE-HALF TO CLARENCE L. KIRK, OF INDIANAPOLIS, INDIANA.

UNIVERSAL HOSE-COUPLING.

1,237,633.     Specification of Letters Patent.     Patented Aug. 21, 1917.

Application filed March 19, 1917. Serial No. 155,804.

*To all whom it may concern:*

Be it known that I, PETER F. GLAZIER, a citizen of the United States, residing at Indianapolis, in the county of Marion and State of Indiana, have invented certain new and useful Improvements in Universal Hose-Couplings, of which the following is a specification.

In the manufacture of fire hose couplings there is much variation among the producers of such equipment as to the outside diameters of the screw-threaded members thereof, as well as to the threads themselves, so that the equipment of one town or city may not fit with that of a neighboring place to which its fire-fighting department may be called in an emergency.

As a result, assistance that would be willingly given, often cannot be used, and much property, and sometimes lives are lost that might have been saved by standardization of equipment in the particulars named.

To standardize the vast amount of equipment now in use would entail great waste and loss, and the object of my invention is to provide an inexpensive and convenient means for coupling together any of the different hose now in use.

I accomplish the above object, and other objects which will hereinafter appear, by the mechanism illustrated in the accompanying drawing, in which—

Figure 1, is a view in side elevation of my double coupling, adapted to connect with both male and female ends of a threaded hose coupling in common use, of any known diameter and thread. Fig. 2, is a longitudinal central section of Fig. 1 and Fig. 3 is a cross section on the line 3—3 of Fig. 1.

Like characters of reference indicate like parts in the several views.

In the drawing, a hose 4 having the female portion 5 of a screw threaded coupling is to be connected with a hose 6, having a threaded male member 7, but of a size too small to screw into the female portion 5, and the latter will not fit the threaded members of my coupling, which sometimes it will do, thereby making it necessary to use the hooks on one end only of my device. The drawing, therefore, shows an extreme case.

The female member 5 is a ring capable of independent movement relative to the sleeve 8, on which it is mounted, and it is provided with the usual diametrically opposite lugs 9, for the engagement of a spanner wrench in holding the ring 5 during assembly and dismemberment of the parts.

An enlargement of the diameter of the member 7 forms a shoulder in the usual way at the inner end of the male threaded portion, and the enlarged part is provided with the opposite lugs 9, to be engaged by a spanner wrench for holding the member, under usual conditions of use, but these and the like lugs on the ring 5 are availed of by me in the attachment of my improved coupling.

The body of my invention is a main sleeve 10, which is externally screw threaded for a major portion of its length, but is preferably bare of threads at its end and is there correspondingly reduced in diameter for more convenient insertion into the ring 5. An enlarged diameter of the sleeve at the inner end of its said threaded portion forms the member 11, the major length of which from its outer end is externally screw threaded, and the inner part next to the shoulder formed by the increased diameter is provided with the spanner-wrench lugs 9 for holding the sleeve 10—11. A bore of sufficient diameter to freely admit the largest male coupling-member 7, is formed in the enlarged member 11, a shoulder 12 being produced at the inner end of the bore, to provide a bearing and stop for the coupling-member 7 when the latter is drawn toward it. A tight joint between the parts 7 and 12, is insured by the interposition of a gasket ring 13, of rubber or other suitable material, and the accidental removal of the gasket is prevented by a low rib 14 in the wall of the bore, over which the gasket is sprung into operative position.

A gasket 15, of like material and for the same purpose as the gasket 13, is inserted in the female coupling ring 5.

Mounted on the threaded portion of the sleeve 10, is an internally threaded sleeve 16, having opposite radial spanner lugs 9, and swivelly mounted on this sleeve is a ring 17, having a pair of diametrically opposite hooks 18, which are hooked around the lugs 9 on the adjacent coupling-ring 5. By screwing the ring 17, in on the sleeve 10 toward the enlarged part 11, the hooks 18 will draw the coupling member 5 on the hose 4 toward the end of sleeve 10, making a water-tight joint at the gasket 15.

Mounted on the threaded enlarged portion 11, is an internally threaded sleeve 19, having opposite radial spanner lugs 9, and swively mounted on this sleeve is a ring 20, having a pair of diametrically opposite hooks 18, which are hooked around the lugs 9, on the adjacent male coupling member 7, and by screwing the sleeve 19 inwardly on the member 11, the hooks will draw the coupling member 7 on hose 6, toward the shoulder 12, making a water-tight joint at the gasket 13.

My coupling device is usually owned and carried by a fire department having hose couplings of a uniform diameter and thread which one end of my device will be made to fit, thereby dispensing with the threaded sleeve and swiveled ring with hooks for that end.

While I have described my invention with more or less minuteness as regards details of construction and arrangement, it is not desired to limit my invention to the precise form shown, nor any more than is pointed out in the claims, but what I do claim as new and wish to secure by Letters Patent of the United States, is—

1. A hose coupling comprising a main exteriorly threaded hollow sleeve, an internally threaded sleeve arranged near the end of said main sleeve and susceptible of longitudinal travel thereon, an independently revoluble ring carried by said internally threaded sleeve, and means carried by said ring for engaging and drawing the adjacent end of the hose into operative relation with said main sleeve when said internally threaded sleeve is rotated in the desired direction.

2. A hose coupling comprising a main exteriorly threaded hollow sleeve, an internally threaded sleeve arranged near the end of said main sleeve and susceptible of longitudinal travel thereon, an independently revoluble ring carried by said internally threaded sleeve, and hooks carried by said ring for engaging and drawing the adjacent end of the hose into operative relation with said main sleeve when said internally threaded sleeve is rotated in the desired direction.

3. In a hose-coupling, the combination with a hose having a half coupling with lugs, of a hose to be joined to the first hose and having a half coupling not a mate to the half coupling on the first hose member, an externally threaded sleeve between the two half couplings, an internally threaded sleeve screwed upon the first sleeve, a ring swively mounted on the second sleeve having hooks engaging the lugs on the half coupling of the first hose and means for connecting the first sleeve with the half coupling on the second hose member.

In witness whereof, I have hereunto set my hand and seal at Indianapolis, Indiana, this 26th day of February, A. D. one thousand nine hundred and seventeen.

PETER F. GLAZIER. [L. S.]